May 29, 1962
G. L. ROGERS
3,036,595
COUPLING ASSEMBLY
Filed April 22, 1959
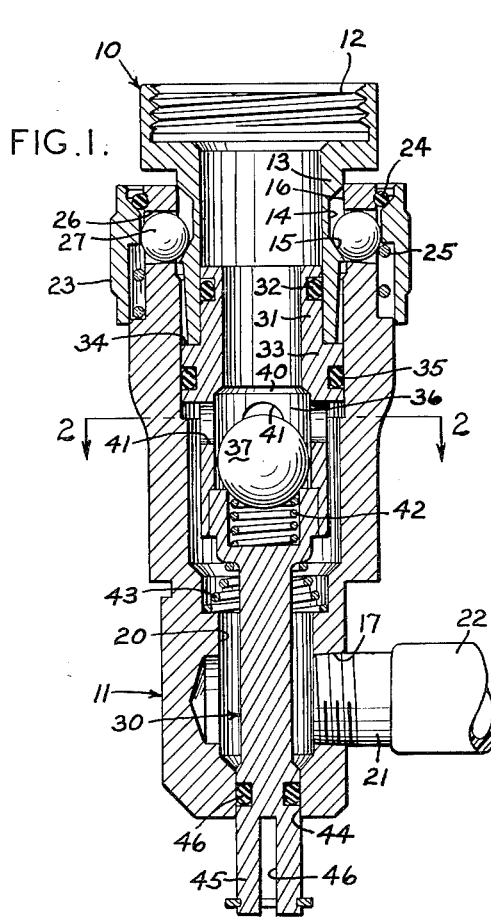
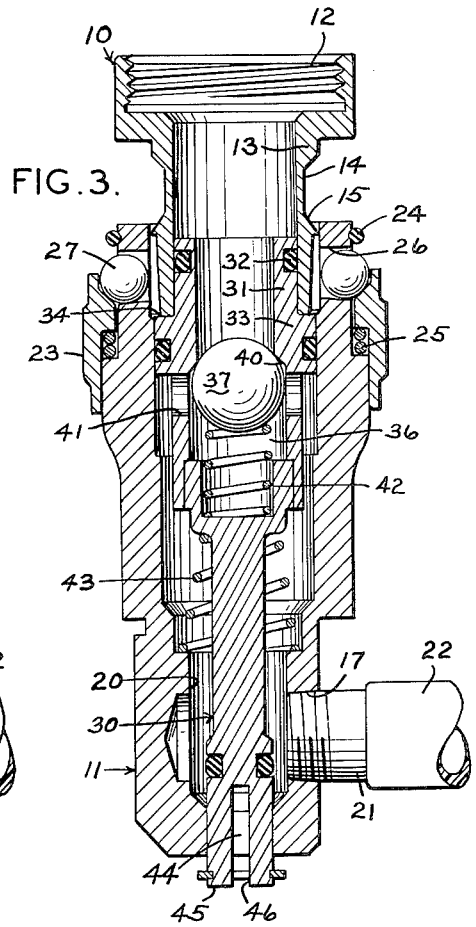
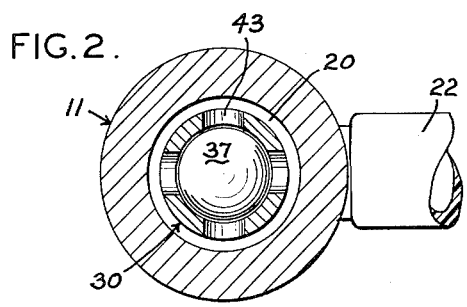
INVENTOR
GERALD L. ROGERS
BY Cohn and Powell
ATTORNEYS United States Patent Office 3,036,595
Patented May 29, 1962

3,036,595
COUPLING ASSEMBLY
Gerald L. Rogers, Brentwood, Mo., assignor to Stile-Craft Manufacturers, Inc., St. Louis, Mo., a corporation of Missouri
Filed Apr. 22, 1959, Ser. No. 808,027
3 Claims. (Cl. 137—596)

This invention relates generally to improvements in a coupling assembly, and more particularly to an improved device of this type which is adapted to be quickly and easily connected and disconnected to a source of fluid under pressure.

Although the subject coupling assembly has many possible job applications, it is particularly useful, for example, in connecting the hose of a portable dishwasher to the faucet at the kitchen sink. With couplings heretofore utilized in such installations, there was a decided possibility of water squirting into the room from the hose coupling when the coupling was disconnected because of the existence of water pressure in the hose, thus causing a serious inconvenience.

It is an important objective of the present invention to provide a coupling assembly in which the hose pressure is automatically relieved and equalized upon operative disconnection of the hose connector body part from the faucet part so as to eliminate the above-mentioned squirting or gushing action of the water in the region of separation of such parts.

An important object is achieved by the provision of a spool valve element slidably mounted in the connector body which is adapted to follow and to be moved by the faucet connector part so that the spool valve element is conditioned upon connection of the coupling to close a relief valve vent and conditioned upon disconnection to open automatically such relief vent.

Still another important objective is realized by the provision of a valve port in the movable spool through which the inlet and outlet are interconnected, and a valve normally closing the port and adapted to open the port for flow therethrough when the coupling parts are connected and water pressure turned on. Other important advantages are afforded by means that operate on the valve to close the port when the water pressure is turned off.

Yet, another important object is afforded by the disposition of the relief vent in the connector body so that any discharge upon disconnection of the coupling will be in a downward direction into the sink.

Another important object is achieved by providing a device of this type which is simple and durable in construction, efficient in operation, economical to manufacture, and which can be readily manipulated and actuated by anyone.

The foregoing and numerous other objects and advantages of the invention will more clearly appear from the following detailed description of a preferred embodiment, particularly when considered in connection with the accompanying drawing, in which:

FIG. 1 is a cross-sectional view of the coupling assembly as seen in a vertical plane passed through its longitudinal axis;

FIG. 2 is a cross-sectional view as seen along line 2—2 of FIG. 1; and

FIG. 3 is a cross-sectional view similar to that shown in FIG. 1, but illustrating the position of the component parts incident to connection or disconnection.

Referring now by characters of reference to the drawing, the coupling assembly consists of a tubular faucet plug generally indicated at 10 and a co-acting hose connector body referred to at 11.

The tubular faucet plug 10 is provided with internal threads 12 at its uppermost end, adapting the plug to be attached to a source of fluid under pressure such as a kitchen sink faucet. The faucet plug 10 includes a reduced lower end nipple portion 13 that is provided with an annular groove 14 partially defined by a cam margin 15.

The hose connector body 11 includes an inlet 16 that opens at the top of the body, and an outlet 17 opening to the side of body 11 at its bottom end. A passageway 20 is provided in hose connector body 11 and operatively interconnects the inlet 16 and outlet 17. The passageway 20 has an internal diameter at inlet 16 that closely approximates the outside diameter of faucet plug nipple portion 13 so as to receive the plug 10. In other words, the faucet plug 10 interfits the passageway 20 at inlet 16 when the connector parts are attached.

A hose fitting 21 is threadedly attached to the hose connector body 11 at the outlet 17 and is adapted to receive a hose 22 leading to an appliance such as a portable dishwasher (not shown).

Slidably mounted on the upper end of hose connector body 11 is a collar 23. A snap retaining ring 24 is attached to the upper end of hose connector body 11 and is adapted to engage the collar 23, hence retaining the collar 23 on body 11 and determining its uppermost position. Located between collar 23 and hose connector body 11 is a compression spring 25 that engages the collar 23 and tends to urge such collar 23 upwardly to its uppermost position illustrated in FIG. 1.

The upper end of hose connector body 11 is provided with a plurality of lateral holes 26 adjacent the collar 23 and opening into the passageway 20 at inlet 16. Disposed and retained in holes 26 are a plurality of balls 27.

When the collar 23 is disposed in its uppermost position illustrated in FIG. 1, the collar 23 engages the balls 27 and tends to urge such balls 27 inwardly into the passageway 20, and hence into engagement with the plug nipple portion 13 when such faucet plug is operatively connected. Further, when the collar 23 is depressed under the loading of spring 25 to the position illustrated in FIG. 3, the balls 27 are permitted to move outwardly of the passageway 20 and hence permit withdrawal of the plug nipple portion 13. Even though balls 27 are radially displaced outwardly, the collar 23 engages the balls 27 and retains them in assembly in the holes 26 on body 11.

A spool constituting a valve element indicated at 30 is slidably mounted in the passageway 20. The spool 30 is provided with a reduced upper end portion 31 adapted to interfit the plug nipple portion 13 when the plug is attached. An O-ring 32 is carried by the upper spool portion 31 and engages the plug nipple portion 13 to provide an effective seal therebetween.

The spool 30 includes an enlarged portion 33 immediately below the uppermost portion 31, the enlarged spool portion 33 providing an upwardly facing shoulder 34 adapted to engage the lower end faucet plug nipple portion 13. An O-ring 35 is carried by the spool portion 33 and provides an effective seal between the spool and the hose connector body 11.

Provided in the spool 30 is a chamber 36 in which is located a ball valve 37. A valve port 40 provided at the uppermost end of chamber 36 and above the ball valve 37 places the chamber 36 in communication with the faucet plug 10 and the source of fluid under pressure. A plurality of side openings 41 are provided in the spool 30 which place the passageway 20 in communication with the chamber 36. A spring 42 located in spool 30 engages the ball valve 37 and tends to urge the ball valve upwardly to close the valve port 40 as is illustrated in FIG. 3.

A compression spring 43 is located in passageway 20 the spring having one end engaging the hose connector body 11 and the other end engaging the spool 30. The compression spring 43 tends to urge the spool 30 upwardly and tends to hold the spool shoulder 34 in engagement with the lower end of the plug 10.

The bottom of the lower end of hose connector body 11 is provided with a relief valve port 44 that places the atmosphere in communication with the passageway 20 on the outlet side of the valve port 40. The spool 30 includes an end portion 45 that extends through the relief valve port 44. An O-ring 46 carried by the spool end portion 45 engages the connecter body 11 to provide an effective seal normally closing the relief valve port 44 when the spool 30 is located in its lowermost position upon operative attachment of the hose connecter body with the faucet plug 10, as illustrated in FIG. 1.

The spool end portion 45 is provided with an elongate slot 46 that is adapted to place the atmosphere in communication with the passageway 20 as the spool 30 moves upwardly toward its uppermost position just prior to operative disconnection of the faucet plug 10.

In operation, the faucet plug 10 is threadedly attached to the kitchen sink faucet, while the hose connector body 11 is connected to the hose 22 of the appliance. In order to connect the faucet plug 10 and hose body 11, the locking collar 23 is moved downwardly to the position illustrated in FIG. 3, and the reduced nipple portion 13 inserted into inlet 16 and into engagement with the spool shoulder 34. This action of collar 23 enables the locking balls 27 to move outwardly to permit the insertion of the plug 10.

As the plug 10 is inserted, the abutment of the plug nipple portion 13 with the spool shoulder 34 causes the spool 30 to be slidably moved to its lowermost position under the compressive loading of spring 43 as is indicated in FIG. 1. When the plug 10 is fully inserted, the collar 23 is released so that it assumes its uppermost position shown in FIG. 1. The collar 23 cams the locking balls 27 inwardly so that the balls 27 enter the annular groove 14 provided on the plug 10. The interlocking action of the balls 27 in the groove 14 locks the faucet plug 10 to the hose connector body 11.

Before the faucet valve is opened and water under pressure is forced through tubular plug 10, the ball valve 37 normally closes the valve port 40 under the action of spring 42, in a position shown in FIG. 3. Further the relief valve port 44 is closed by the spool end portion 45, as shown in FIG. 1.

When the faucet valve is opened and water pressure is exerted on the ball valve 37, the ball valve 37 is depressed to its lowermost position shown in FIG. 1, so as to open the valve port 40. The water then is able to flow through the passageway 20 from the inlet to the outlet. The path taken by the water flow is through the tubular faucet plug 10, through the valve port 40 in spool 30, into the chamber 36 and through the side openings 41 into the passageway 20, and thence through the hose fitting 21.

When the water pressure is relieved by shutting off the faucet valve, the ball valve 37 is urged upwardly by spring 42 to close the valve port 40. Usually, the appliance such as a portable dishwasher has a shut-off valve at its connection to hose 22. Thus, it is seen that a water pressure exists in hose 22 and in passageway 20 on the outlet side of valve port 40 when the valve port 40 is closed by ball valve 37. There is also a water pressure existing in the passageway on the inlet side of valve port 40 between the valve port 40 and the faucet valve.

If it is now desired to disconnect the faucet plug 10 from hose connector body 11, the locking collar 23 is depressed to the position illustrated in FIG. 3, thus enabling the locking balls 27 to move outwardly under the camming action of cam shoulder 15 as the body 11 is moved downwardly relative to plug 10.

As the hose connector body 11 moves downwardly, the spool 30 moves upwardly following the lower end of the plug nipple portion 13, the spool shoulder 34 maintaining contact with the nipple portion 13. Just before the faucet plug end disengages from the spool shoulder 34, the spool 30 is moved upwardly to a position illustrated in FIG. 3, in which the slot 46 opens the relief valve port 44, thus placing the atmosphere in communication with the passageway 20 on the outlet side of valve port 40. As a result, the pressure in the passageway 20 is quickly relieved. Any water trapped in the passageway 20 is removed through the relief valve port 44 and is directed downwardly into the kitchen sink. Then, the faucet plug 10 operatively disengages from the spool shoulder 34 and the hose connector body 11 is removed from the plug. Because the water pressure has been previously relieved, there is no likelihood of any water squirting out of the passageway 20 from the inlet 16.

Although the invention has been described by making detailed reference to a single preferred embodiment, such detail is to be understood in an instructive, rather than in any restrictive sense, many variants being possible within the scope of the claims hereunto appended.

I claim as my invention:

1. In a coupling assembly, a valve body provided with a passageway having an inlet and an outlet, a tubular plug detachably connected to said body at said inlet and movable into said passageway, an element slidably mounted in said passageway, means urging said slide element against said plug so that the slide element is within limits by said plug as determined by the connection and disconnection of said plug, said slide element including a valve means controlling flow through said passageway from inlet to outlet, said valve means being in operative communication with the inlet in all positions of said slide element, means normally holding said valve means in a closed position until water pressure is applied through said tubular plug, the valve body including a relief vent, said slide element closing or opening said relief vent upon movement of said slide element within said limits by said plug incident respectively to connection or disconnection of said plug.

2. In a coupling assembly, a valve body provided with a passageway having an inlet and an outlet, a tubular plug detachably connected to said body at said inlet and movable into said passageway, a valve element slidably mounted in said passageway, means urging said valve element against said plug so that said plug moves the valve element to one limit upon insertion and to another limit upon withdrawal, said valve element including a valve port interconnecting said inlet and outlet, a valve carried by said valve element normally closing said port and adapted to open said port upon exertion of flow pressure through said inlet, and valve body provided with a relief valve port communicating with said passageway, the valve element including a relief valve portion closing said relief valve port when the valve element is moved to one limit by said plug upon plug connection and opening said relief valve port in the other limit upon plug withdrawal.

3. In a coupling assembly, a connector body provided with a passageway having an inlet and an outlet, a tubular plug detachably connected to said body at said inlet and movable into said passageway, a spool slidably mounted in said passageway, means urging said spool against said plug so that said plug moves the spool to one limit upon insertion of said plug and to another limit upon withdrawal of said plug, the spool including a chamber provided with a valve port interconnecting said inlet and outlet, a valve located in said chamber on the outlet side of said valve port and communicating with the inlet in all positions of said spool, resilient means tending to urge said valve to a normally closed position with said valve port, the spool being provided with aperture communicating the chamber with said outlet, the connector body being provided with a relief valve port communicating with said passageway on the outlet side of said first valve port, the spool including a relief valve portion closing said relief valve port when the spool is moved to one limit by said plug upon plug insertion and opening said relief valve port in the other limit upon plug withdrawal.

References Cited in the file of this patent

UNITED STATES PATENTS

| | | |
|---|---|---|
| 1,164,077 | Duey | Dec. 14, 1915 |
| 2,112,146 | DiGiovanni | Mar. 22, 1938 |
| 2,397,265 | Jacobsson | Mar. 26, 1946 |
| 2,657,709 | Gillerstrom | Nov. 3, 1953 |
| 2,670,751 | Wilson | Mar. 2, 1953 |